United States Patent
Smith et al.

(10) Patent No.: US 12,099,488 B1
(45) Date of Patent: Sep. 24, 2024

(54) APPARATUS AND METHODS FOR GENERATING AN INSTRUCTION SET

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/408,269

(22) Filed: Jan. 9, 2024

(51) Int. Cl.
G06F 16/00 (2019.01)
G06F 16/22 (2019.01)
G06F 16/28 (2019.01)

(52) U.S. Cl.
CPC ........ G06F 16/2237 (2019.01); G06F 16/285 (2019.01)

(58) Field of Classification Search
CPC .................... G06F 3/011; G06F 3/147; G06F 2203/0384; G06F 3/0346; G06F 3/03545; G06F 3/038; G06F 18/00; G06F 3/0481; G06F 3/04842; G06F 3/14; G06F 17/15; G06F 30/398; G06F 7/5443; G06F 7/556; G06F 11/1028; G06F 9/4881; G06F 9/5061; G06F 9/5066; G06F 11/1068; G06F 11/3664; G06F 11/3672; G06F 3/0601; G06F 3/0613; H04N 23/45; H04N 23/56; G06Q 20/02; G06Q 20/20; G06Q 20/4014; G06Q 20/40145; H04B 10/1141; H04B 10/116; H04B 10/11; G06T 11/60; G02B 13/0015; G02B 19/0023

See application file for complete search history.

(56) References Cited

U.S. PATENT DOCUMENTS

| | | | |
|---|---|---|---|
| 11,069,082 B1* | 7/2021 | Ebrahimi Afrouzi | H04N 23/56 |
| 11,188,865 B2 | 11/2021 | Powers | |
| 2014/0081652 A1* | 3/2014 | Klindworth | G06Q 10/0635 705/2 |
| 2014/0258067 A1 | 9/2014 | Thorsen | |

FOREIGN PATENT DOCUMENTS

| | | |
|---|---|---|
| WO | 2017/023332 A1 | 2/2017 |
| WO | 2022/107403 A1 | 5/2022 |

* cited by examiner

*Primary Examiner* — Shyue Jiunn Hwa

(74) *Attorney, Agent, or Firm* — Caldwell Intellectual Property Law

(57) ABSTRACT

An apparatus and method for generating an instruction set is provided. The apparatus includes a processor and a memory connected to the processor. The memory contains instructions configuring the processor to send an offer datum from a client device to a user device, receive an acceptance datum from a client device, receive at least a rejection datum from the client device and to receive a threshold datum from a database communicatively connected to the processor Accordingly, the processor may classify the acceptance datum and the rejection datum to the threshold datum by generating a composite acceptance datum and composite rejection datum based and determining whether the composite acceptance datum exceeds a trigger by comparing the composite acceptance datum to the threshold datum, and generate an interface data structure including an input field to receive at least a user-input datum into the input field.

18 Claims, 10 Drawing Sheets

200C

| Selling vs. Buying | | A "seller" is someone who can get rejected. A "buyer" is someone who can do the rejecting. | Name: Date: |
|---|---|---|---|
| | Selling: Where a "buyer" rejected you | Buying: Where you rejected a "seller" | |
| 1 | 1978: First marriage in which I was rejected for (1) wanting to become a successful entrepreneur; (2) not caring about unfairness and capitalism; and (3) not caring about injustices related to lack of sufficient governmental assistance. 204C | 1974: Rejecting any income-earning future except being an entrepreneur, no matter how challenging or difficult it might be. | |
| 2 | 1955-1974: Every job of my life - childhood, teens, and twenties - where, I suggesting better solutions, methods or processes, not only were my ideas rejected but also my attempts to be an innovator inside and outside my strict job description. | October 1984: Rejecting all coaching clients except entrepreneurs willing to work with me inside of the Strategy Circuit structure and process. 212C | |
| 3 | 1978: Being rejected for a bank loan even thought I had receivables to repay the bank within 90 days. The receivables existed because three clients "rejected" my expectations of getting paid within 30 days of completing the agreed-upon work. | November 1989: Rejecting all client relationships except ambitious entrepreneurs willing to participate in SC workshop groups - no more one-on-one coaching. 208C | |
| Insights for discussion and decision-making | | | |
| Creating a better future always involves rejecting undesirable aspects of the past and present. | Rejecting something now always creates immediately new opportunities that catch me by surprise. | In solving any problem, a great way to find the solution is to always start with what I want to reject - and do it. That in itself, may be the solution, requiring no other thinking or activity. | |

FIG. 2C

APPARATUS AND METHODS FOR GENERATING AN INSTRUCTION SET

FIELD OF THE INVENTION

The present invention generally relates to the field of artificial intelligence (AI). In particular, the present invention is directed to an apparatus and methods for determining a resource distribution.

BACKGROUND

Recent increases in computational efficiency have enabled iterative analysis of data describing complex phenomena; however, such data are only valuable inasmuch they accurately represent the phenomena in question and may fail for lack of systems to correctly identify a degree of inaccuracy in the analysis itself. Prior programmatic attempts to resolve these and other related issues have suffered from inadequate user-provided data intake and subsequent processing capabilities.

SUMMARY OF THE DISCLOSURE

In an aspect, an apparatus for generating an instruction set includes at least a processor, a memory connected to the processor, the memory containing instructions configuring the at least a processor to generate an interface data structure including an input field, wherein the interface data structure configures a remote display device to display an input field, receive an offer datum at the input field, receive at least an acceptance datum from at least a client device, wherein the acceptance datum describes initiation of resource transfer from a respective client device to the user device based on the sequence of activities, receive at least a rejection datum from at least the client device, wherein the rejection datum describes cessation of resource transfer from a respective client device to the user device based on the sequence of activities, generate a threshold datum, wherein the threshold datum describes a trigger value required for transformation of the user device from a first condition to a second condition, compare at least the acceptance datum and at least the rejection datum to the threshold datum, wherein comparing comprises generating a composite acceptance datum based on aggregating acceptance data, generating a composite rejection datum based on aggregating rejection data, and determining whether the composite acceptance datum exceeds the trigger value by comparing the composite acceptance datum to the threshold datum, and configure, using the interface data structure, the remote device to display the determination.

In another aspect, a method for generating an instruction set includes generating an interface data structure including an input field, wherein the interface data structure configures a remote display device to display an input field, receiving an offer datum at the input field, receiving at least an acceptance datum from at least a client device, wherein the acceptance datum describes initiation of resource transfer from a respective client device to the user device based on the sequence of activities, receiving at least a rejection datum from at least the client device, wherein the rejection datum describes cessation of resource transfer from a respective client device to the user device based on the sequence of activities, generating a threshold datum, wherein the threshold datum describes a trigger value required for transformation of the user device from a first condition to a second condition, comparing at least the acceptance datum and at least the rejection datum to the threshold datum, wherein comparing includes generating a composite acceptance datum based on aggregating acceptance data, generating a composite rejection datum based on aggregating rejection data; and determining whether the composite acceptance datum exceeds the trigger value by comparing the composite acceptance datum to the threshold datum, and configuring, using the interface data structure, the remote device to display the determination.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
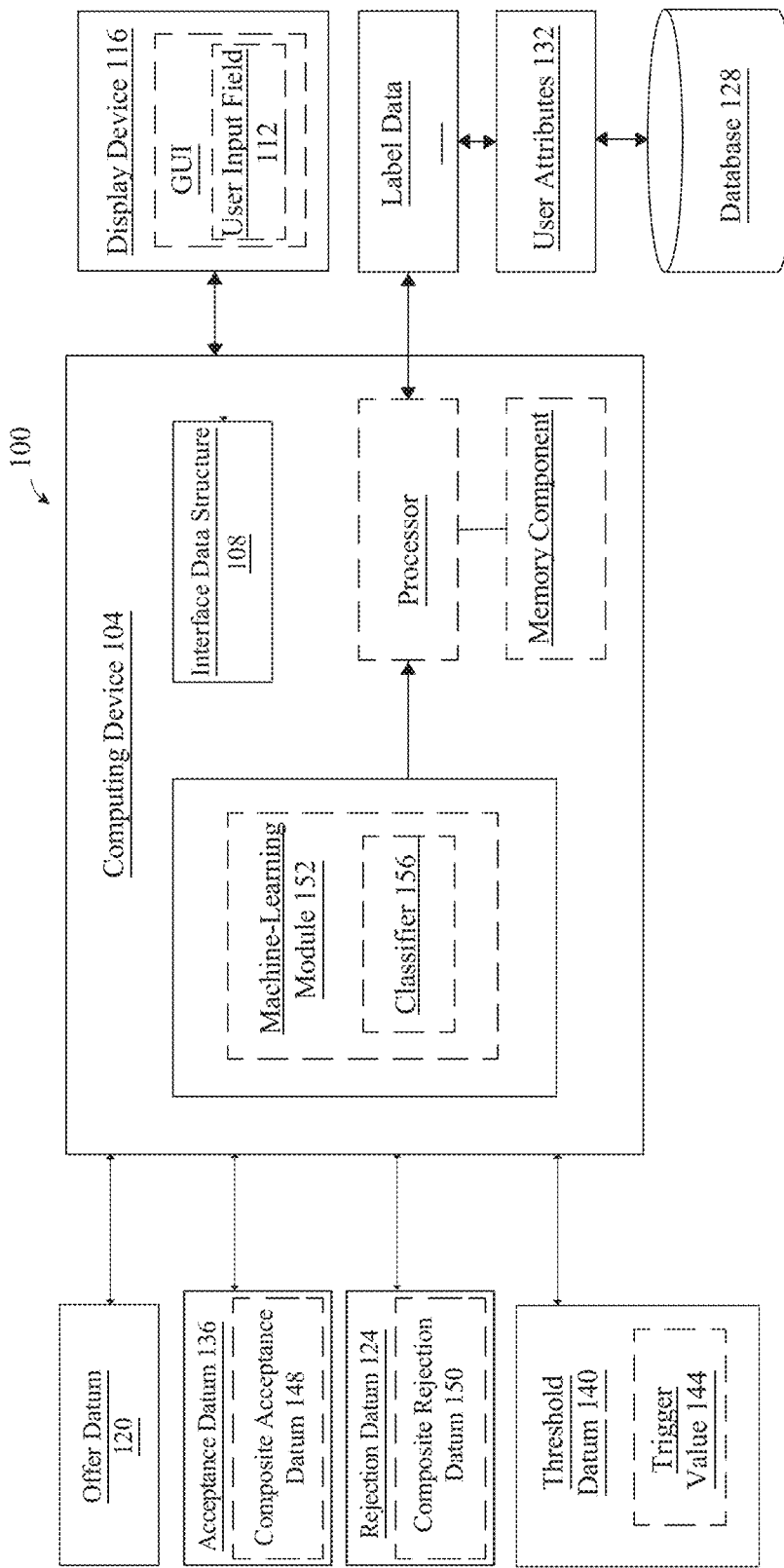
FIG. 1 is a block diagram of an embodiment of an apparatus for generating an instruction set for a user.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for generating an "instruction set", such as an instruction set including data describing transforming a user device from a first condition, e.g., indicative of a rejection rate assessed at a first time, to a second condition, e.g., indicative of an acceptance rate assessed at a second time, which is subsequent to the first time. Accordingly, various entrepreneurial processes undertaken by new business proprietors and the like may be accurately tracked from, for example, an initial inception stage during which the entrepreneur is mostly rejected by potential customers to a later enterprise stage during which the entrepreneur rejects potential bidders and customers to maximize efficiency, focus, and attainment of business objectives. Described processes are executed by a processor and a memory connected to the processor. The memory contains instructions configuring the at least a processor to send an offer datum from a client device to at least a user device. At least a user device is communicatively connected to the processor and the client device. "Offer datum," as used herein, is data related to information describing a potential offer. For example, the offer datum may include detail to an invitation to enter into a contract on certain term. The offer datum may include information describing the offeror and offeree. The offer datum may describe a sequence of activities, such as the inception and subsequent daily operation of any type and/or size business. The processor may receive at least an acceptance datum from at least a client device, where the acceptance datum describes initiation of resource transfer from a respective client device to the user device based on the sequence of activities, receive at least a rejection datum from at least a client device, where the rejection datum describes cessation of resource transfer from a respective client device to the user device based on the sequence of activities, and receive a threshold datum from a database communicatively connected to the processor, where the threshold datum describes a trigger value required for transformation of the user device from a first condition to a second condition. A "trigger value," as used herein, is data representing a numerical threshold associated with the transformation process. "Threshold datum, as used herein, a data structure representing a threshold beyond which acceptance or rejection should be recommended. There may be a threshold for acceptance and another for rejection. Each of the threshold data may be generated using machine learning based on examples of past acceptances and rejections coupled with measures of subsequent success, as described in this disclosure. Accordingly, the processor may classify at least the acceptance datum and at least the rejection datum to the threshold datum. Classifying at least the acceptance datum includes generating a composite acceptance datum based on aggregating acceptance data, generating a composite rejection datum based on aggregating rejection data, and determining whether the composite acceptance datum exceeds the trigger by comparing the composite acceptance datum to the threshold datum.

"Resource transfer," as used herein, is a datum, and/or elements, data and the like describing the flow of scarce resources from one party to another in exchange for services rendered. That is, resource transfer in the context for payment of professional services rendered can involve a client paying their attorney for a legal opinion rendered by the attorney to the client. Likewise, resource transfer can occur in the context of medical treatment by payment by a third-party health insurance provider to pay a hospital and/or physician for rendering treatment to the patient as covered by the insurance provider. Those skilled in the art will appreciate that other types of and circumstances of repayment can exist in the context of resource transfer as used herein. A "contract," as generally understood by many jurisdictions including at least several states of the United States (US), may include three requirements, such as an "offer," an "acceptance" of that offer, and "consideration." An "offer," as used herein, is a promise that one party makes in exchange for another party's performance. Alternatively described, an "offer" is an invitation to enter into a contract on certain terms, and can be expressed in many different ways, from a short and simple oral statement to a long and detailed written statement. "Acceptance," as used herein, means to assent to the terms of an offer. Some uses of the term "acceptance" in a legal sense may include that, in the context of contracts, acceptance refers to one person's compliance with the terms of an offer made by another. "Consideration" is a promise, performance, or forbearance bargained by a promisor in exchange for their promise. In some contexts, consideration may be considered as the main or primary element of a contract. For example, in such contexts, without consideration by the involved parties, a contract cannot be enforceable.

Aspects of the present disclosure recognize that advances in computational efficiency have permitted for more demanding resource and activity progress tracking. Such progress tracking can now digitally monitor various forms of complex phenomena, ranging from sophisticated new business formation initiatives, merger, acquisition and divestiture activity, or interpersonal reflection relating to thoughts, opinions, or other perspectives, including a new businesses transition from an emerging startup, which is often rejected by potential partners and customers, to an established enterprise now positioned to reject unsuitable business partners and/or customers to, for example, maximize operational efficiency, as introduced above.

In addition, computing device is configured to generate an interface data structure 108 including an input field based on ranking the first transfer datum and the second transfer datum. An "interface data structure 108," as used in this disclosure, is a user interface which is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls.

Interface data structure 108 may include a data structure used to "query," such as by digitally requesting, for data results from a database and/or for action on the data. "Data structure," in the field of computer science, is a data organization, management, and storage format that is usually chosen for efficient access to data. More particularly, a "data structure" is a collection of data values, the relationships among them, and the functions or operations that can be applied to the data. Data structures also provide a means to manage relatively large amounts of data efficiently for uses such as large databases and internet indexing services. Generally, efficient data structures are essential to designing efficient algorithms. Some formal design methods and programming languages emphasize data structures, rather than algorithms, as an essential organizing factor in software design. In addition, data structures can be used to organize the storage and retrieval of information stored in, for example, both main memory and secondary memory.

Interface data structure 108 may include a data organization format used to digitally request a data result or action on the data. In addition, the "interface data structure 108" can be displayed on a display device, such as a digital peripheral, smartphone, or other similar device, etc. The interface data structure 108 may be generated based on received "user data," defined as including historical data of the user. Historical data may include attributes and facts about a user that are already publicly known or otherwise available, such as prior time allocations spent on certain activity patterns, such as leisure, education, income-generation, etc. In some embodiments, interface data structure 108 may be generated by a machine-learning model. As a non-limiting example, the machine-learning model may receive user data and output interface data structure 108 queries.

In addition, the processor may generate an interface data structure 108 including an input field, where the interface data structure 108 configures a remote display device to display the input field to the user device, receive at least a user-input datum into the input field, wherein the user-input datum updates the threshold datum, and to display the instruction set including displaying the user-input datum.

Referring now to FIG. 1, an exemplary embodiment of apparatus 100 for generating an "instruction set" is provided. As introduced earlier, an "instruction set" includes data describing transforming a user device from a first condition, e.g., indicative of a rejection rate assessed at a first time, to a second condition, e.g., indicative of an acceptance rate assessed at a second time, which is subsequent to the first time. That is, the instruction set can accordingly describe data tracking a transformative process beginning with, for example, an entrepreneur initiating a new business enterprise in any particular technical area or field. Upon inception, the new company may experience rejections from potential partners and customers due to a variety of reasons, including lack of notoriety and proven performance in the marketplace, any one of which may be tracked by data input and/or processed by the below-described machine-learning processes to output the instruction set including data describing transformation of the newly conceived business to an established enterprise. For example, such a transformation may be tracked based on a relative number of acceptances input by potential business partners and/or customers relative to a pre-defined threshold value, where surpassing acceptance beyond the threshold indicates performance of the business beyond its initial start-up phase. Now, the business can selectively choose entities with which it will transact business and therefore is no longer financially compelled to accept any type of business to maintain ongoing solvency.

Accordingly, in one or more embodiments, apparatus 100 includes computing device 104, which may include without limitation a microcontroller, microprocessor (also referred to in this disclosure as a "processor"), digital signal processor (DSP) and/or system on a chip (SoC) as described in this disclosure. Computing device 104 may include a computer system with one or more processors (e.g., CPUs), a graphics processing unit (GPU), or any combination thereof. Computing device 104 may include a memory component, such as memory component, which may include a memory, such as a main memory and/or a static memory, as discussed further in this disclosure below. Computing device 104 may include a display component (e.g., display device 116, which may be positioned remotely relative to computing device 104), as discussed further below in the disclosure. In one or more embodiments, computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices, as described below in further detail, via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, any combination thereof, and the like. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks, as described below, across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device 104.

With continued reference to FIG. 1, computing device 104 may be designed and/or configured to perform any method, method step, or sequence of method steps in any embodiment described in this disclosure, in any order and with any degree of repetition. For instance, computing device 104A may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 1, computing device 104 may be configured to generate an interface data structure 108 including user input field 112. The interface data structure 108 configures display device 116 to display the input field to the user device, receive at least a user-input datum into the input field, where the user-input datum updates the threshold datum, and display the instruction set including displaying the user-input datum. More particularly, in some embodiments, generating the interface data structure 108 includes retrieving data describing attributes of a user from a database communicatively connected to the processor, and generating the interface data structure 108 based on the data describing attributes of the user.

Still referring to FIG. 1, in some embodiments, computing device 104, is configured to configure a remote display device to display an event handler graphic corresponding to a data-reception event handler using interface data structure 108. Remote display device may include, without limitation any device suitable for use as a computing device as described in this disclosure, including a client device or user device such as a laptop, desktop computer, smartphone, tablet, workstation, or the like. As used in this disclosure, an "event handler graphic," is a graphical element with which a user of remote device may interact to enter data, for instance and without limitation for a search query or the like. An event handler graphic may include, without limitation, a button, a link, a checkbox, a text entry box and/or window, a drop-down list, a slider, or any other event handler graphic that may occur to a person skilled in the art upon reviewing the entirety of this disclosure. An "event handler," as used in this disclosure, is a module, data structure, function, and/or routine that performs an action on remote device in response to a user interaction with event handler graphic. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements. Event handler may convert data into expected and/or desired formats, for instance such as date formats, currency entry formats, name formats, or the like. Event handler may transmit data from remote device to computing device 104.

Still referring to FIG. 1, the remote device may be configured by interface data structure 108 to traverse a data structure, such as without limitation a document-object model (DOM) to locate elements such as links or other user-interaction elements. A "Document Object Model," as used herein is a cross-platform and language-independent interface that treats an HTML or XML document as a tree structure wherein each node is an object representing a part of the document. The DOM represents a document with a logical tree. Each branch of the tree ends in a node, and each node contains objects. DOM methods allow programmatic access to the tree; with them one can change the structure, style or content of a document. Nodes may have event handlers attached to them. Once an event is triggered, the event handlers may get executed.

Still referring to FIG. 1, interface data structure 108 may design and configure a remote device to generate a continuous application layer in a display window. Continuous application layer may be a display that occupies the entirety of display window of the remote device. Continuous application layer may include a plurality of content viewing portions. Initialization of any action by remote device may be accomplished by any suitable means, including any user activation of remote device either directly or indirectly, and/or any other data described herein as received and/or displayed by remote device; loading of any particular item of data may be performed in response to user commands. User commands may be provided using any suitable input including mouse, keyboard, touchscreen, touchpad, voice inputs, and the like. Initialization and/or startup of client program 136 may occur automatically, for instance upon boot-up of remote device and/or in response to any event, command script, or the like.

Still referring to FIG. 1, interface data structure 108 may display information by generating of modifying fields/links in response to user interaction, such as user input/clicks and the like, based on attributes of the user. For example, interface data structure 108 may receive a corpus of data. A corpus may include any data that may be stored in electronic format, including without limitation textual data, data stored as source code, data stored as executable code, or data in a format for interpretation. A corpus may include data in structured human-readable or machine-readable forms such as extensible markup language (XML), hypertext markup language (HTML), comma-separate value (CSV) format, or the like. A corpus may include combinations of types of data in one or more files. As a non-limiting example, a corpus may include a file that is wholly or partially executed on at least the processor for transmission to a remote device, such as a PHP: Hypertext Preprocessor (PHP) file, action server page (ASP), or Java Server Page (JSP) file. A corpus may include instructions, programming, or other elements that are rendered on a device displaying a corpus or an output derived therefrom as creating interactive material for users, such as hypertext links, buttons, text entry fields, and the like. A corpus may include client-side programming, such as scripting language or code, such as JavaScript or Java applets, that executes on a remote device; such client-side programming may run automatically upon reception of all or part of a corpus at a remote device, may be triggered by one or more event handlers, such as event handlers that detect a user interaction with remote device, or a combination thereof. The quantity and types of links, entry fields, display windows, and other forms of interactive or display material may be generated based on the attributes of the user. For example, in regard to a finance based user, entry fields configured to receive user input disclosing investments portfolio may generated, whereas entry fields configured to receive user input disclosing gross sale of goods may be generated for a culinary based user.

Still referring to FIG. 1, apparatus 100 may include a dynamic content transmitter. Dynamic content transmitter may include any hardware module or logic circuitry. Dynamic content transmitter may be instantiated using one or more commands of computer control logic. In an embodiment, dynamic content generator may be configured to generate a dynamic packet set that combines at least a first portion of the corpus with an event handler that generates at least a second portion of the corpus. Dynamic packet set may include, without limitation, data that a remote device renders and displays as text, data that remote device renders and displays as hyperlinks, data that the remote device renders and displays as event handlers, and the like.

With continued reference to FIG. 1, computing device 104 is configured to receive at least an offer datum 120, at input field 112. More particularly, in some embodiments, memory component is connected to processor and memory component contains instructions configuring processor to initiate offer datum 120 to be sent from a user device to at least a client device, wherein the at least a user device is communicatively connected to the processor and the client device. Offer datum 120 describes a sequence of activities, such as those related to the launch of a new business by a user of the described processes, e.g., an entrepreneur, including offering goods and services for sale to potential customers, some of which may accept such offers, and others which may reject such offers as to be further described herein. Alternatively, the user may be a representative of a new business entity, such as an entrepreneur, who may electronically contact potential customers, or clients, each equipped with or having access to interaction with the user through a respective client device, which may also be a smartphone, digital peripheral, and the like. Offer datum 120 may describe current preferences relating to, as indicated earlier, a promise that one party makes in exchange for another party's performance. Alternatively described, an "offer" is an invitation to enter into a contract on certain terms.

In some embodiments, offer datum 120 may be input into computing device 104 manually by the client, who may be associated with any type or form of establishment (e.g., a business, university, non-profit, charity, etc.), or may be an independent entity (e.g., a solo proprietor, an athlete, an artist, etc.). In some instances, offer datum 120 may be extracted from a business profile, such as that may be available via the Internet on LinkedIn®, a business and employment-focused social media platform that works through websites and mobile apps owned my Microsoft® Corp., of Redmond, WA). More particularly, such a business profile may include the past achievements of a user in various fields such as business, finance, and personal, depending on one or more related circumstances. Persons skilled in the art, upon reviewing the entirety of this disclosure, will be aware of various other ways or situations in which offer datum 120 may be input, generated, or extracted for various situations and goals. For example, in an example where the client is a business, offer datum 120 may be extracted from or otherwise be based on the client's business profile, which may include various business records such as financial records, inventory record, sales records, and the like. In addition, in one or more embodiments, offer datum 120 may be generated by evaluating interactions with external entities, such as third parties. More particularly, in a business-related context, such an example external entity (or third party) may be that offered by Moody's Investors Services, Inc., Moody's Analytics, Inc. and/or their respective affiliates and licensors, of New York, NY. That is, business strategy consulting, legal, or other related ancillary professional services, such as accounting, provided on a time-based basis, such as hourly, may be assessed for effectiveness in the aggregate based on such third-party assessments. For example, a positive rating may indicate that a combination of a company's in-house legal counsel and outside law firm counsel are collectively achieving business objectives in a timely and favorable manner as viewed by investors and/or the public stock markets in general. Services rendered may include providing international financial research on bonds issued by commercial and government entities, including ranking the creditworthiness of borrowers using a standardized ratings scale which measures expected investor loss in the event of default. In such an example, offer datum 120 extracted from such an external entity may include ratings for debt securities in several bond market segments, including government, municipal and corporate bonds, as well as various managed investments such as money market funds and fixed-income funds and financial institutions including banks and non-bank finance companies and asset classes in structured finance.

In addition, the alternative, in one or more embodiments, offer datum 120 may be acquired using web trackers or data scrapers. As used herein, "web trackers" are scripts (e.g., programs or sequences of instructions that are interpreted or carried out by another program rather than by a computer) on websites designed to derive data points about user preferences and identify. In some embodiments, such web trackers may track activity of the user on the Internet. Also, as used herein, "data scrapers" are computer programs that extract data from human-readable output coming from another program. For example, data scrapers may be programmed to gather data on user from user's social media profiles, personal websites, and the like. In some embodiments, offer datum 120 may be numerically quantified (e.g., by data describing discrete real integer values, such as 1, 2, 3 n, where n=a user-defined or prior programmed maximum value entry, such as 10, where lower values denote lesser significance relating to favorable business operation and higher values denote greater significance relating to favorable business operation). For example, for classifying at least an element describing a pattern of offer datum 120 (e.g., of a business) to rejection datum 124 in the context of fiscal integrity in financial services and retirement planning, offer datum 120 may equal "3" for a business, such as an investment bank stock or mutual fund share, etc., suffering from credit liquidity problems stemming from a rapidly deteriorating macroeconomic environment and/or poor quality senior management, a "5" for only matching industry peers, and an "8" for significantly outperforming industry peers, etc.

Still referring to FIG. 1, other example values are possible along with other exemplary attributes and facts about a client (e.g., a business entity, or an aspiring athlete) that are already known and may be tailored to a particular situation where explicit business guidance (e.g., provided by the described progression sequence) is sought. In some embodiments attributes and facts about a client may include the mindset of the client. A mindset may include a buyer's mindset referring to the perspective or mental framework that a client adopts when engaging in a contractual decision. It encompasses the thoughts, attitudes, and behaviors that a client exhibits as they evaluate options, make choices, and interact with sellers or products. A buyer's mindset may include traits or evidence of a client being value-oriented, information seeking, rational, emotional influenced, risk taking, and the like. A buyer's mindset may include patterns, such as a pattern of activity or conduct undertaken by the client regarding acquisition of goods or services from the user, and the like In one or more alternative embodiments, offer datum 120 may be described by data organized in or represented by lattices, grids, vectors, etc., and may be adjusted or selected as necessary to accommodate client-defined circumstances or any other format or structure for use as a calculative value that a person skilled in the art would recognize as suitable upon review of the entirety of this disclosure.

In one or more embodiments, offer datum 120 may be provided to or received by computing device 104 using various means. In one or more embodiments, offer datum 120 may be provided to computing device 104 by a business, such as by a human authorized to act on behalf of the business including any type of executive officer, an authorized data entry specialist or other type of related professional, or other authorized person or digital entity (e.g., software package communicatively coupled with a database storing relevant information) that is interested in improving and/or optimizing performance of the business overall, or in a particular area or field over a defined duration, such as a quarter or six months. In some examples, a human may manually enter offer datum 120 into computing device 104 using, for example, user input field 112 of interface data structure 108 of display device 116. For example, and without limitation, a human may use display device 116 to navigate a GUI generated by interface data structure and provide offer datum 120 to computing device 104. Non-limiting exemplary input devices include keyboards, joy sticks, light pens, tracker balls, scanners, tablets, microphones, mouses, switches, buttons, sliders, touchscreens, and the like. In other embodiments, offer datum 120 may be provided to computing device 104 by a database over a network from, for example, a network-based platform. Offer datum 120 may be stored, in one or more embodiments, in database 128 and communicated to computing device 104 upon a retrieval request from a human and/or other digital device (not shown in FIG. 1) communicatively connected with computing device 104. In other embodiments, offer datum 120 may be communicated from a third-party application, such as from a third-party application on a third-party server, using a network. For example, offer datum 120 may be downloaded from a hosting website for a particular area, such as a networking group for small business owners in a certain city, or for a planning group for developing new products to meet changing client expectations, or for performance improvement relating to increasing business throughput volume and profit margins for any type of business, ranging from smaller start-ups to larger organizations that are functioning enterprises. In one or more embodiments, computing device 104 may extract offer datum 120 from an accumulation of information provided by database 128. For instance, and without limitation, computing device 104 may extract needed information database 128 regarding improvement in a particular area sought-after by the business and avoid taking any information determined to be unnecessary. This may be performed by computing device 104 using a machine-learning model, which is described in this disclosure further below.

At a high level, and as used herein, "machine-learning" describes a field of inquiry devoted to understanding and building methods that "learn"—that is, methods that leverage data to improve performance on some set of defined tasks. Machine-learning algorithms may build a machine-learning model based on sample data, known as "training data," to make predictions or decisions without being explicitly programmed to do so. Such algorithms may function by making data-driven predictions or decisions by building a mathematical model from input data. This input data used to build the machine-learning model may be divided into multiple data sets. In one or more embodiments, three data sets may be used in different stages of the creation of the machine-learning model: training, validation, and test sets.

With continued reference to FIG. 1, described machine-learning models may be initially fit on a training data set, which is a set of examples used to fit parameters. Here, example training data sets suitable for preparing and/or training described machine-learning processes may include data relating to historic business operations under historic circumstances, or circumstances in certain enumerated scenarios, such as during a period low interest rates or relatively easy bank lending, or during a period of highly restrictive fiscal policy implemented to control and address undesirably high inflation. Such training sets may be correlated to similar training sets of user attributes 132 relating to attributes of the user. In the described example of offer datum 120 relating to a business, user attributes 132 may describe one or more elements, datum, data and/or attributes relating to client engagement with services provided by the user. For example, a business may require financing to launch and can approach a bank (e.g., a type of user) for one or more types of loans. In this example, user attributes 132 may describe or relate to data describing retail, regional, or even investment banks. In addition, user attributes may include data describing liquidity available to customers (e.g., clients) and performance of outstanding loans and other products. In addition, offer datum 120 may include data describing a pattern of activity or conduct undertaken by the client regarding acquisition of goods or services from the user, depending on, for example, repayment behavior of the client to the user for services rendered by the user to the client. In banking, that may mean that the client will assess risk in relatively difficult macroeconomic conditions as dictated by higher-than-average federal interest rates, etc.

In addition, in one or more embodiments, computing device 104 is configured to receive at least an element of acceptance datum 136. For the purpose of this disclosure, a "acceptance datum" is an element, datum, or elements of data describing, as introduced earlier, assent to the terms of an offer. For example, acceptance datum may include data tending to support the acceptance of an offer. Some uses of the term "acceptance" in a legal sense may include that, in the context of contracts, acceptance refers to one person's compliance with the terms of an offer made by another. More particularly, in one or more embodiments, memory component contains instructions configuring processor to receive at least acceptance datum 136 from at least a client device, where the acceptance datum describes initiation of resource transfer (e.g., as described earlier, such as resources including money) from a respective client device to the user device based on the sequence of activities, e.g., relating to launching of a new business enterprise. That is, in some embodiments, acceptance datum 136 may describe acceptance of offers described by offer datum 120, which may also describe consideration as introduced earlier, thereby resulting in a complete contract and/or transaction.

Alternatively, should potential customers or clients reject offers made by the user via the user device as described earlier, in some embodiments, computing device 104 may be configured to receive at least rejection datum 124 from at least a client device, wherein "rejection datum," as used herein, is element, datum, or elements of data describing information regarding a rejection to an offer. Rejection data 124 may include information describing cessation of resource transfer from a respective client device to the user device based on the sequence of activities. That is, potential customers who were once paying customers to the user may cease payment as reflected by rejection datum 124, or potential customers who are disinterested in offers made by the user may never pay the user as no transaction has been completed, also possible to be reflected as a cessation of resource transfer. Still further, processor may receive threshold datum 140 from database 128 communicatively connected to computing device 104, where threshold datum 140 describes trigger value 144 required for transformation of the user device from a first condition (e.g., describing a start-up phase of a business indicated by frequent rejections to offers) to a second condition (e.g., describing an enterprise phase of the business indicated by the business frequently rejecting potential new customers in favor of optimizing the business in other aspects, etc.). In addition, in some embodiments, receiving threshold datum 140 includes retrieving data describing current preferences of the user device between a minimum value and a maximum value from the database and receiving a form element input into the input field, where the form element describes at least the minimum value.

Still referring to FIG. 1, in some embodiments, computing device 104 may be configured to classify, using machine-learning processes described below, at least acceptance datum 136 and at least rejection datum 124 to threshold datum 140. More particularly, classifying at least acceptance datum 136 may include generating composite acceptance datum 148 based on aggregating acceptance data, generating composite rejection datum 150 based on aggregating rejection data, and determining whether composite acceptance datum exceeds trigger value 144 by comparing composite acceptance datum 148 to threshold datum 140. A "composite acceptance datum," as used herein, is acceptance data that is aggregated, for example, as described above. A "composite rejection datum," as used herein, is rejection data that is aggregated, for example, as described above. In addition, or the alternative, classifying may include classifying at least rejection datum 124 by determining whether composite rejection datum is beneath trigger value 144 by comparing composite rejection datum 150 to threshold datum 140.

In addition, in some embodiments, classifying at least acceptance datum 136 includes classifying at least an instance of composite acceptance datum 148 to threshold datum 140, determining a proximity value of a respective acceptance datum 136 to threshold datum 140 calculated based on classification of composite acceptance datum 148 to threshold datum 140, and adjusting threshold datum 140 based on composite acceptance datum 148 to reduce the proximity value. Further, in some embodiments, classifying at least acceptance datum 136 includes classifying composite acceptance datum 148 to threshold datum 140, where classifying composite acceptance datum 148 may include comparing composite acceptance datum 148 to threshold datum 140, and determining a parity value based on comparison of composite acceptance datum 148 to threshold datum 140, where the parity value is included within the instruction set.

Still referring to FIG. 1, in some embodiments, classifying at least acceptance datum 136 may include evaluating the user-input datum by classifying one or more new instances of the user-input datum to at least the threshold datum, generating at least a divergence value based on the classification, and displaying the at least a divergence value. In addition, or the alternative, in some embodiments, classifying at least acceptance datum 136 may include classifying composite acceptance datum 148 to a label selected from a plurality of labels (such as acceptance label 304, rejection label 308, progress label 312, or purpose label 316 of offer evaluation database 300 of FIG. 3) based on at least the divergence value, where classifying at least composite acceptance datum may include organizing at least some labels based on their respective proximity to a minimal output type and a maximum output type, aggregating acceptance data based on the classification, and classifying aggregated acceptance data to the label having a closest proximity to the maximum output type.

In addition, in some embodiments, classifying at least an instance of offer datum 120 to rejection datum 124 may include determining a proximity of a respective offer datum 120 to rejection datum 124 based on the sequence of activities. As used herein, and in the fields of computer science and data science, the term "proximity" between two objects is a function of the proximity between the corresponding attributes of the two objects. Proximity measures refer to measures of similarity and dissimilarity, which may be relevant because they are used by several data mining techniques, such as clustering, nearest neighbor classification, and anomaly detection.

Still referring to FIG. 1, classifying at least acceptance datum 136 and at least rejection datum 124 to threshold datum 140 may include classifying acceptance datum 136 to rejection datum 124, where classifying acceptance datum 136 includes comparing acceptance datum 136 to rejection datum 124, and determining a parity value based on comparison of acceptance datum 136 to rejection datum 124, wherein the parity value is included within the resource distribution. As used herein, and the fields of computer science and data science, parity (from the Latin "paritas," meaning equal or equivalent) is analytical technique that checks whether data has been lost or written over when it is moved from one place in storage to another or when it is transmitted between computers. Since data transmission may not be an entirely error-free process, data may not always be received in the same way as it was transmitted. A parity bit adds "checksums," which are small-sized blocks of data derived from another block of digital data for the purpose of detecting errors that may have been introduced during its transmission or storage, into data that enable the target device to determine whether the data was received correctly. An additional binary digit, the parity bit, may be added to a group of bits that are moved together. This bit, sometimes referred to as a check bit, is used only to identify whether the moved bits arrived successfully.

Still further, in some embodiments, the memory contains instructions configuring processor to determine a "pattern," where the pattern describes user interaction with the database. A "pattern," also referred to as "pattern recognition," as used herein and in the fields of computer science and data science, is a part of computational analysis and refers to a process of identifying patterns in a data set to categorize, process and resolve information more effectively Patterns are pieces or sequences of data that have one or multiple similarities. Accordingly, processor may classify at least an element of the pattern to the divergence value, and adjust the pattern based on a "magnitude" of the divergence value. As used herein, and in the fields of computer science and data science, "magnitude," alternatively referred to as "sign magnitude," is defined as follows a number's representation in sign magnitude has the same number of bits as the original number, plus a bit called the sign bit on the extreme left (the MSB). The sign bit denotes that the number is negative if it is set to 1 and the number is positive if it is set to 0.

Accordingly, described concepts relating to classification of data for determining a resource distribution, can be quantified by one or more elements, datum or data and thereby processed by "machine-learning processes" executed by machine-learning module 152 of computing device 104 to, for example, be evaluated prior to display of multiple instances of rejection datum 124 (e.g., a first transfer datum and at least a second transfer datum, each respectively describing, for a payment) hierarchically based on at least user-input datum 224A in user input field 112. More particularly, and as described further herein with relation to FIG. 4, a "machine-learning process," as used in this disclosure, is a process that automatically uses training data to generate an algorithm that will be performed by a computing device/module (e.g., computing device 104 of FIG. 1) to produce outputs given data provided as inputs. Any machine-learning process described in this disclosure may be executed by machine-learning module 152 of computing device 104 to manipulate and/or process rejection datum 124 relating to describing instances or characteristics of confidence for the user.

"Training data," as used herein, is data containing correlations that a machine-learning process may use to model relationships between two or more categories of data elements. For instance, and without limitation, training data, in this instance, may include multiple data entries, each entry representing a set of data elements that were recorded, received, and/or generated together and described various confidence levels or traits relating to demonstrations of confidence. Data elements may be correlated by shared existence in each data entry, by proximity in a given data entry, or the like. Multiple categories of data elements may be related in training data according to various correlations, which may indicate causative and/or predictive links between categories of data elements, which may be modeled as relationships such as mathematical relationships by machine-learning processes as described in further detail below. In addition, training data may be formatted and/or organized by categories of data elements, for instance by associating data elements with one or more descriptors corresponding to categories of data elements.

For instance, a supervised learning algorithm (or any other machine-learning algorithm described herein) may include one or more instances of rejection datum 124 describing confidence of a user as described above as inputs. Accordingly, computing device 104 of FIG. 1 may receive user-input datum 224A into input field 148 of display device 116. User-input datum 224A may describe data for updating, for example, at least rejection datum 124. In addition, in some embodiments, either the user or the third-party may dictate rejection datum 124 by inputting rejection datum 124 into computing device 104. Classifier 156 of machine-learning module 152 may classify one or more instances of rejection datum 124 relative to, for example, rejection datum 124 (e.g., also in the context of confidence, such as achieving an optimum confidence level). Accordingly, in some embodiments, classifier 156 may classify instances of rejection datum 124 that more closely relate to or resemble threshold datum 140 within a closer proximity to threshold datum 140.

Still referring to FIG. 1, in some embodiments, a scoring function representing a desired form of relationship to be detected between inputs and outputs may be used by described machine learning processes. Such as scoring function may, for instance, seek to maximize the probability that a given input (e.g., offer datum 120 and/or combination of elements and/or inputs (e.g., offer datum 120 and/or any combination of at least acceptance datum 136 and/or at least rejection datum 124 is associated with a given output (e.g., the described instruction set) to minimize the probability that a given input (e.g., offer datum 120) is not associated with a given undesirable output (e.g., digitally generated guidance in the form of the instruction set that results in additional occurrences of rejection datum 124).

Still further, described processes executed by machine-learning module 152 of computing device 104 may generate an output (e.g., the described instruction set and/or as instruction set display 224B) inclusive of a text and/or digital media-based content describing a strategy recommendation as a function of, for example, rejection datum 124, offer datum 120, acceptance datum 136.

In some instances, in one or more embodiments, computing device 104 is configured to receive at least an element of rejection datum 124. In addition, or the alternative, computing device 104 may be configured to receive one or more instances of an "outlier cluster," as used for methods described in U.S. patent application Ser. No. 18/141,320, filed on Apr. 28, 2023, titled "METHOD AND AN APPARATUS FOR ROUTINE IMPROVEMENT FOR AN ENTITY," and, U.S. patent application Ser. No. 18/141,296, filed on Apr. 28, 2023, titled "SYSTEMS AND METHODS FOR DATA STRUCTURE GENERATION BASED ON OUTLIER CLUSTERING," both of which are incorporated herein by reference herein in their respective entireties. Accordingly, in this example, rejection datum 124 may be determined or identified using one or more outlier clusters. More particularly, described machine-learning processes may use, as inputs, one or more instances of offer datum 120, acceptance datum 136, rejection datum 124, and/or threshold datum 140 in combination with the other data described herein, and use one or more associated outlier cluster elements with target outputs, such as instruction set display 224B. As a result, in some instances, classifier 156 may classify inputs to target outputs including associated outlier cluster elements to generate instruction set display 224B.

In addition, and without limitation, in some cases, database 128 may be local to computing device 104. In another example, and without limitation, database 128 may be remote to computing device 104 and communicative with computing device 104 by way of one or more networks. A network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which computing device 104 connects directly, dynamically, and non-hierarchically to as many other computing devices as possible. A "network topology" as used in this disclosure is an arrangement of elements of a communication network. Network may use an immutable sequential listing to securely store database 128. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered.

Database 128 may include keywords. As used in this disclosure, a "keyword" is an element of word or syntax used to identify and/or match elements to each other. For example, without limitation, a keyword may be "income-generation" in the instance that a suer is seeking to increase income. In another non-limiting example, keywords of a key-phrase may be "leisure" in an example where the user is seeking to increase leisure-related activities and the like. Database 128 may be implemented, without limitation, as a relational database, a key-value retrieval datastore such as a NOSQL database, or any other format or structure for use as a datastore that a person skilled in the art, upon reviewing the entirety of this disclosure, would recognize as suitable upon review of the entirety of this disclosure.

With continued reference to FIG. 1, a "classifier," as used in this disclosure is type or operational sub-unit of any described machine-learning model or process executed by machine-learning module 152, such as a mathematical model, neural net, or program generated by a machine-learning algorithm known as a "classification algorithm"

that distributes inputs into categories or bins of data, outputting the categories or bins of data and/or labels associated therewith. A classifier may be configured to classify and/or output at least a datum (e.g., one or more instances of any one or more of offer datum 120, acceptance datum 136, rejection datum 124, and/or rejection datum 124 as well as other elements of data produced, stored, categorized, aggregated or otherwise manipulated by the described processes) that labels or otherwise identifies a set of data that are clustered together, found to be close under a distance metric, or the like.

Referring again to FIG. 1, computing device 104 may be configured to identifying business impact by using classifier 156 to classify one or more instances of any one or more of offer datum 120, acceptance datum 136, rejection datum 124, and/or rejection datum 124 based on user attributes 132 and/or category data 162. Accordingly, classifier 156 of machine-learning module 152 may classify attributes within user attributes 132 related to modifying a sequence of activities in the first activity pattern and adjusting at least the second activity pattern based on modification of the first activity pattern.

In addition, in some embodiments, machine-learning module 152 performing the described correlations may be supervised. Alternatively, in other embodiments, machine-learning module 152 performing the described correlations may be unsupervised. In addition, classifier 156 may label various data (e.g., one or more instances of any one or more of offer datum 120, acceptance datum 136, rejection datum 124, and/or rejection datum 124 as well as other elements of data produced, stored, categorized, aggregated, or otherwise manipulated by the described processes) using machine-learning module 152. For example, machine-learning module 152 may label certain relevant parameters of one or more instances of offer datum 120 with parameters of one or more user attributes 132.

In addition, machine-learning processes performed by machine-learning module 152 may be trained using one or more instances of category data 162 to, for example, more heavily weigh or consider instances of category data 162 deemed to be more relevant to the business. More specifically, in one or more embodiments, category data 162 may be based on or include correlations of parameters associated with offer datum 120 to parameters of user attributes 132. In addition, category data 162 may be at least partially based on earlier iterations of machine-learning processes executed by machine-learning module 152. In some instances, running machine-learning module 152 over multiple iterations refines correlation of parameters or data describing entity operations (e.g., associated with offer datum 120) with parameters describing at least user attributes 132.

Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Further referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Figure 2:
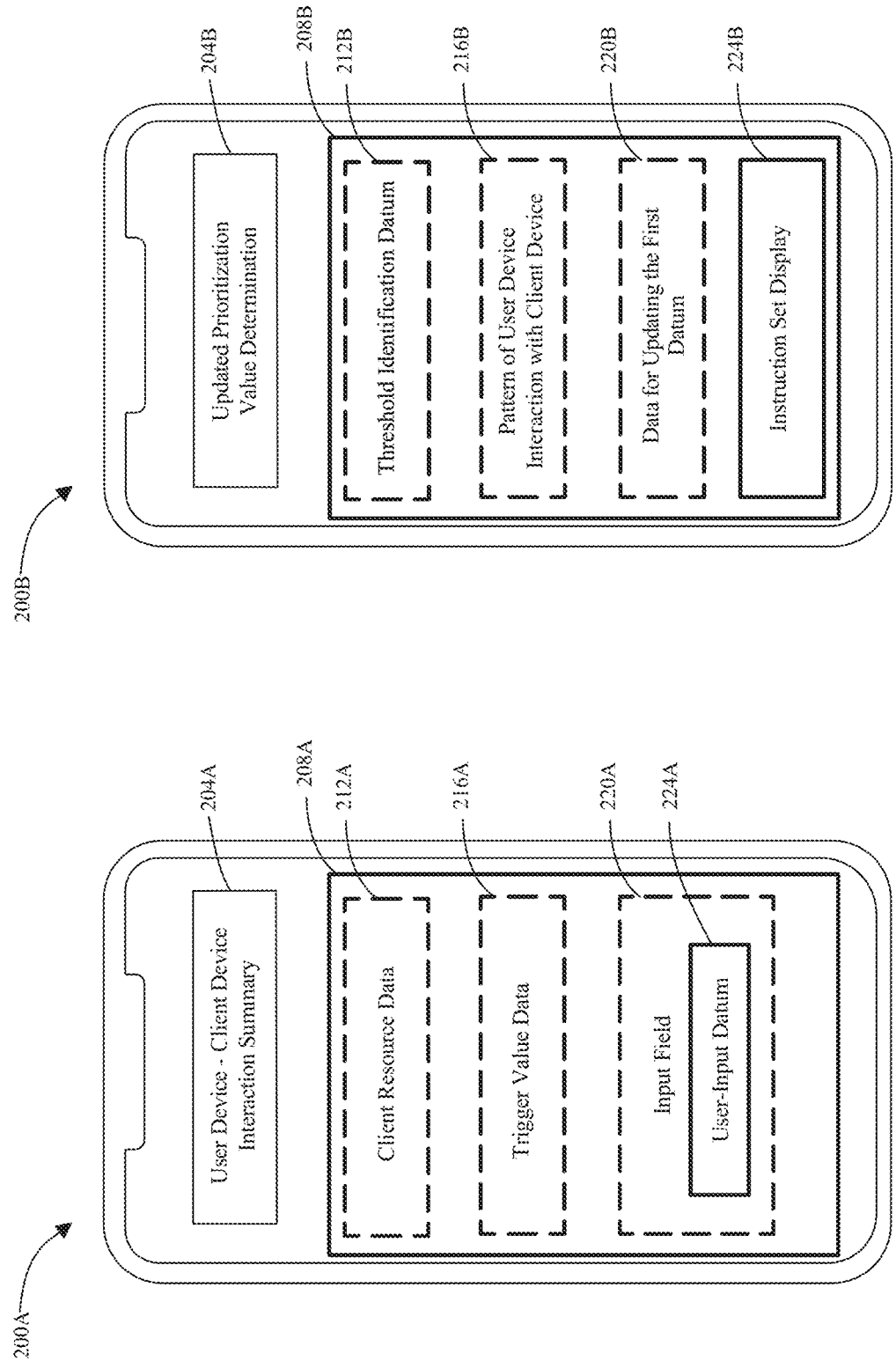
FIGS. 2A-2B are diagrammatic representations of multiple exemplary embodiments of output generated by an interface data structure.
FIG. 2C is an example of a display screen generated by the interface data structure of FIGS. 2A-2B.

Continuing to refer to FIG. 1, computing device is configured to configure, using the interface data structure 108, the remote device to display the determination. This may include, without limitation, modifying the interface data structure 108 to generate a new field at the remote device, which new field may display determination, composite rejection datum, acceptance datum, threshold, or any other data and/or representation thereof described in this disclosure. Interface data structure 108 modification may include determining at least vector 212C of FIG. 2C of display screen 200C, which may be a visual representation of the described interface data structure 108 and thereby displayed by a display device 116, from user-input datum 224A (also shown by first label 204C of display screen 200C) to threshold datum 140 (also shown by second label 208C of display screen 200C) and configuring the remote display device to display a representation of at least the vector. Still further, determining the at least vector 212C from user-input datum 224A to threshold datum 140 further comprises generating vector 212C including an angle value and a distance value, where the angle value and the distance value describe at least a "divergence value" between user-input datum 224A and threshold datum 140. As used herein, and in the field of computer science, a computation is said to diverge if it does not terminate or terminates in an exceptional state. Otherwise, it is said to converge. In domains where computations are expected to be infinite, such as process calculi, a computation is said to diverge if it fails to be productive (e.g., to continue producing an action within a finite amount of time). Here, the offer datum 120 describes phenomena dissimilar to the acceptance datum 136, thereby facilitating calculation of the described "divergence" value. In some instances, the interface data structure 108 configures a display device 116 to generate at least an additional input field based on the divergence value, which describes divergence between the first datum and the second datum.

In some embodiments, generating the interface data structure 108 may include generating at least an additional input field based on a divergence value, where the divergence value describes divergence between the composite acceptance datum and the composite rejection datum. In addition, in one or more embodiments, classifying at least acceptance datum 136 may include determining a pattern based on user interaction with the database 128 classifying at least an element of the pattern to the divergence value, and adjusting the pattern based on a magnitude of the divergence value.

Referring now to FIGS. 2A-2B, exemplary embodiments of user input field 112 as configured to be displayed by GUI of display device 116 based on an interface data structure 108 are illustrated. As defined earlier, an "interface data structure 108" refers to, for example, a data organization format used to digitally request a data result or action on the data (e.g., stored in a database). In one or more embodiments, each output screen 200A-200B may be an example of an output screen configured to be displayed by display device 116 of FIG. 1 by the described interface data structure 108. That is, more particularly, the described interface data structure 108 may configure display device 116 of FIG. 1 to display any one or more of output screens 200A-200B as described in the present disclosure. Accordingly, output screen 200A may include multiple forms of indicia.

In one or more embodiments, output screen 200A and output screen 200B may be examples of user input field 112 and/or GUI as displayed by display device 116, which may be a "smart" phone, such as an iPhone, or other electronic peripheral or interactive cell phone, tablet, etc. Output screen 200A may be a screen initially displayed to a user (e.g., a human or a human representing or acting on behalf of a business or some other entity, and have user engagement area 208 including identification field 204A, client resource data field 212A, trigger value data field 216A, user-input field 220A, which may include one or more instances of user-input datum 224A describing data for selecting a preferred attribute of any one or more repayment behaviors associated with one or more instances of offer datum 120.

In addition, in one or more embodiments, user-input datum 224A may be reflective of and/or provide a basis for user attributes 132. Persons skilled in the art, upon reviewing the entirety of this disclosure, will be aware of various ways in which fewer or additional interactive user input fields may be displayed by screen 208A. Identification field 204A may identify described processes performed by processor of computing device 104 by displaying identifying indicia, such as "User Device-Client Device Interaction Summary" as shown in FIG. 2A to permit, for example, a human to interact with GUI and input information relating to a field of choice (e.g., business operations), through (for example) interactivity provided by identification field 204A.

Such information can include data describing activities performed by the business relating to the business achieving its defined goal (e.g., rejection datum 124 of FIG. 1). In some instances, a human may select from one or more options (not shown in FIG. 2A) relating to prompts provided by identification field 204A to input such information relating to specific details of, for example, the business. In addition, in some embodiments, any of the described fields may include interactive features, such as prompts, permitting for a human to select additional textual and/or other digital media options further identifying or clarifying the nature of the business relating to the respective specifics of that field. For example, client resource data field 212A may display assessments of corresponding instruction sets regarding relevance and potential for positive impact on the business and may thereby also provide interactive features permitting the human to input additional data or information relating to expectations of positive of negative assessments for a given instruction set. Such additional human-input data may be computationally evaluated by described machine-learning processes executed by machine-learning module 152 and thereby correspondingly appear in the described progression sequence.

Like output screen 200A, output screen 200B may be an example of a screen subsequently shown to a human as described earlier based on human-provided input to any one or more of the displayed fields. That is, output screen 200B may display "Instruction Set for User" in identification field 204B as indicating completion of intake of human-provided input and that described machine-learning processes have completed described classifying processes to output prioritization assessment area 208B to the user. For example, in one or more embodiments, prioritization assessment area 208B may also include multiple human-interactive fields, including threshold identification field 212B, user device—client device interaction field 216B, preferred attribute field 220B, and instruction set display 224B generated as described earlier.

Persons skilled in the art, upon reviewing the entirety of this disclosure, will be aware of various ways in which fewer or additional interactive human input fields may be displayed by output screen 200B. Each field within prioritization assessment area 208B may display any combination of human interactive text and/or digital media, each field intending to provide specific data-driven feedback directed to optimizing ongoing business performance of the business. Various example types of specifics (e.g., "decrease risky leverage in high interest rate conditions") are shown in prioritization assessment area 208B, but persons skilled in the art will be aware of other example types of feedback, each of which being generated as suitable for a given business by computing device 104. In addition, in one or more embodiments, any one or more fields of prioritization assessment area 208B may be human-interactive, such as by posing a query for the human to provide feedback in the form of input such that described machine-learning processes performed by machine-learning module 152 may intake refined input data and correspondingly process related data and provide prioritization assessment area 208B. In some embodiments, such processes may be performed iteratively, thereby allowing for ongoing refinement, redirection, and optimization of prioritization assessment area 208B to better meet the needs of the client or user.

Figure 3:
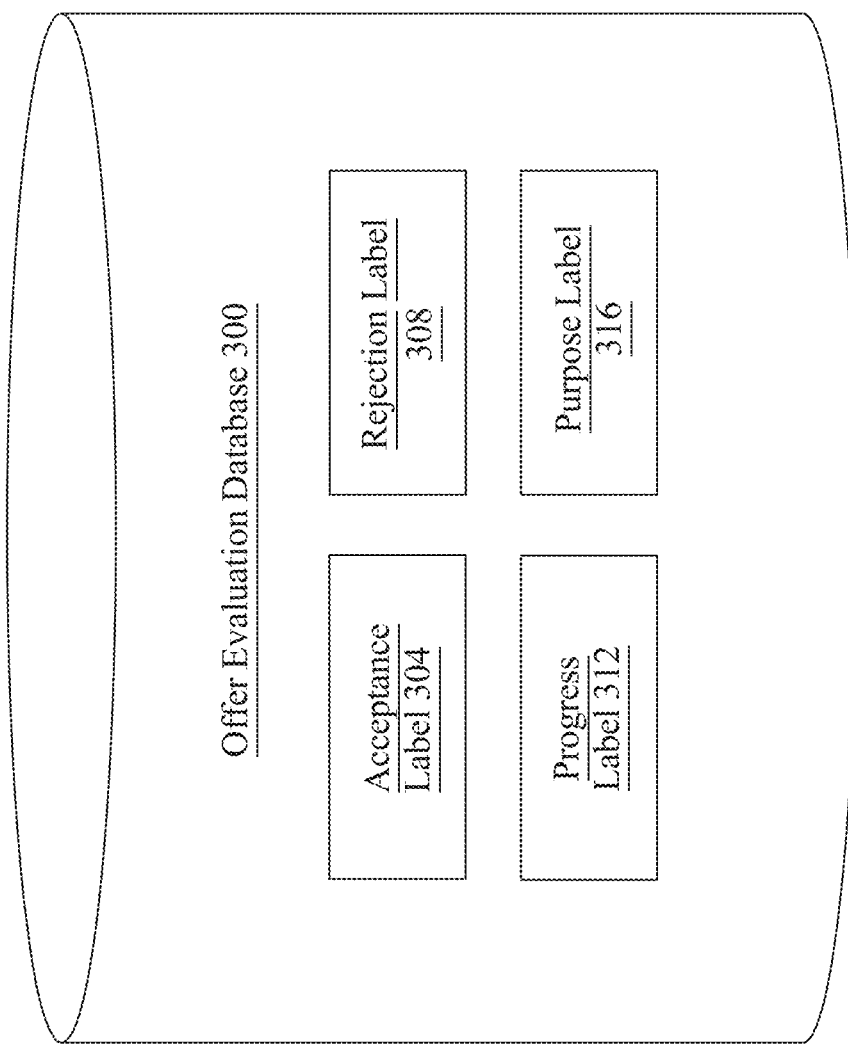
FIG. 3 is a diagrammatic representation of a transfer objective database.

Referring now to FIG. 3, an exemplary embodiment of offer evaluation database 300 is illustrated. In one or more embodiments, offer evaluation database 300 may be an example of database 128 of FIG. 1. Query database may, as a non-limiting example, organize data stored in the user activity database according to one or more database tables. One or more database tables may be linked to one another by, for instance, common column values. For instance, a common column between two tables of expert database may include an identifier of a query submission, such as a form entry, textual submission, or the like, for instance as defined below; as a result, a query may be able to retrieve all rows from any table pertaining to a given submission or set thereof. Other columns may include any other category usable for organization or subdivision of expert data, including types of query data, identifiers of interface data structure 108s relating to obtaining information from the user, times of submission, or the like. Persons skilled in the art, upon reviewing the entirety of this disclosure, will be aware of various ways in which user activity data from one or more tables may be linked and/or related to user activity data in one or more other tables.

In addition, in one or more embodiments, computing device 104 may be configured to access and retrieve one or more specific types of user attributes 132 and/or other data types, e.g., one or more instance of offer datum 120, acceptance datum 136, rejection datum 124 and/or rejection datum 124, as well as threshold datum 140, categorized in multiple tables from offer evaluation database 300. For example, as shown in FIG. 3, offer evaluation database 300 may be generated with multiple categories including acceptance label 304, rejection label 308, progress label 312 and purpose label 316. Consequently, the described processes may classify one or more instances of offer datum 120 from acceptance label 304 to acceptance datum 136 and/or user-input datum 224A that may be input user input field 112 of FIG. 1. In some instances, user-input datum 224A may describe data for selecting a preferred attribute of any one or more skills associated with one or more instances of rejection datum 124. In addition, described processes may retrieve data describing additional attributes related to the preferred attribute of rejection datum 124 from offer evaluation database 300 connected with the processor based on acceptance label 304 (e.g., or, alternatively, one or more of rejection label 308, progress label 312, and/or purpose label 316, etc.).

Figure 4:
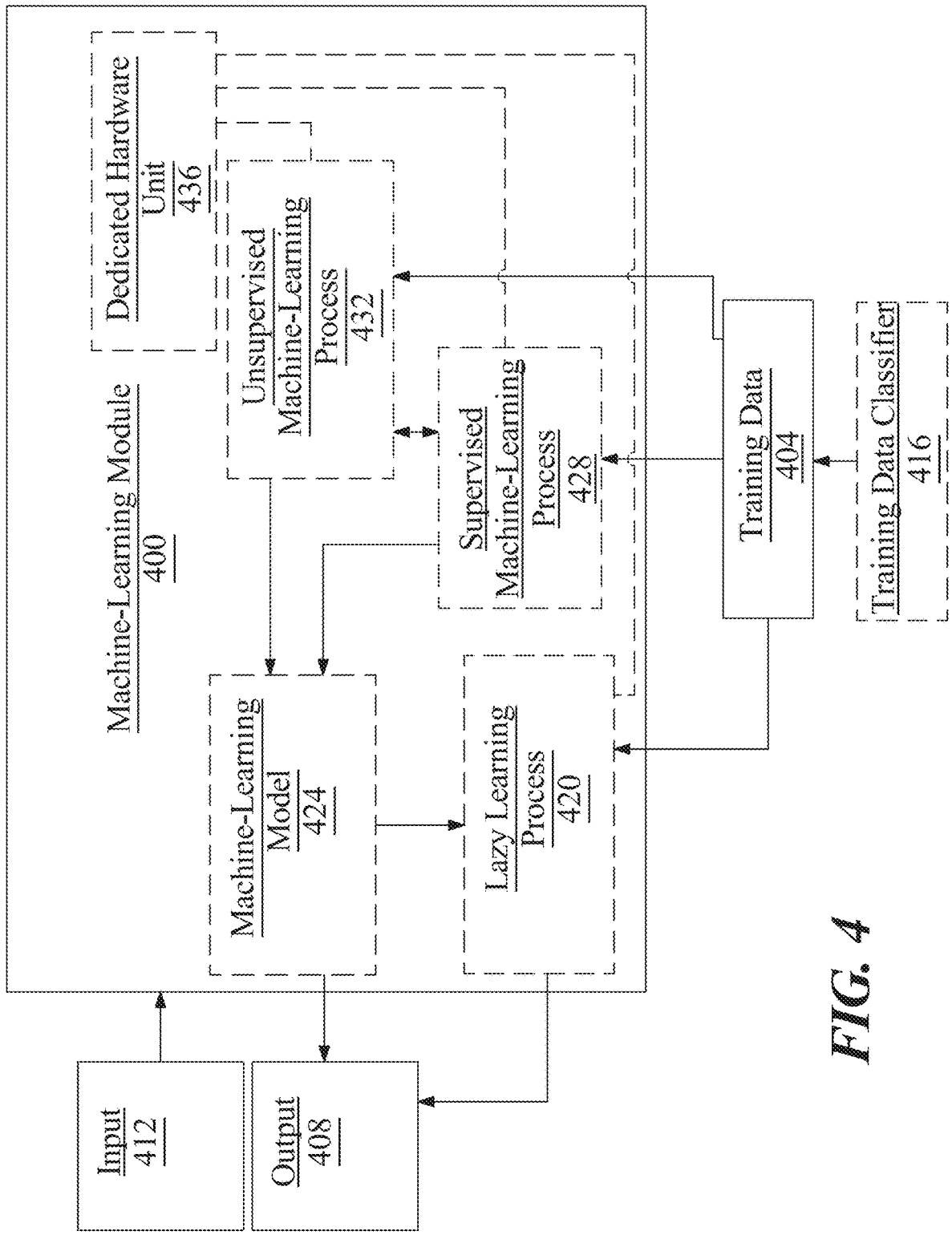
FIG. 4 is a block diagram of exemplary machine-learning processes.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, data relating to historic business operations under historic circumstances.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to data relating to historic business operations under historic circumstances, or circumstances in certain enumerated scenarios, such as during a period low interest rates or relatively easy bank lending, or during a period of highly restrictive fiscal policy implemented to control and address undesirably high inflation. These subs-sets of training data improve the function of the processor by optimizing categorization of offer datum 120 and other inputs as described above in generating an instruction set.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identify as having poor quality data, where "poor quality" is defined as having a signal to noise ratio below a threshold value.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 4, computing device, processor, and/or module may down-sample elements of a training example to a desired lower number of data elements. As a non-limiting example, a high pixel count image may have 246 pixels, however a desired number of pixels may be 128. Processor may downsample the high pixel count image to convert the 246 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAS, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 432 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 432 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
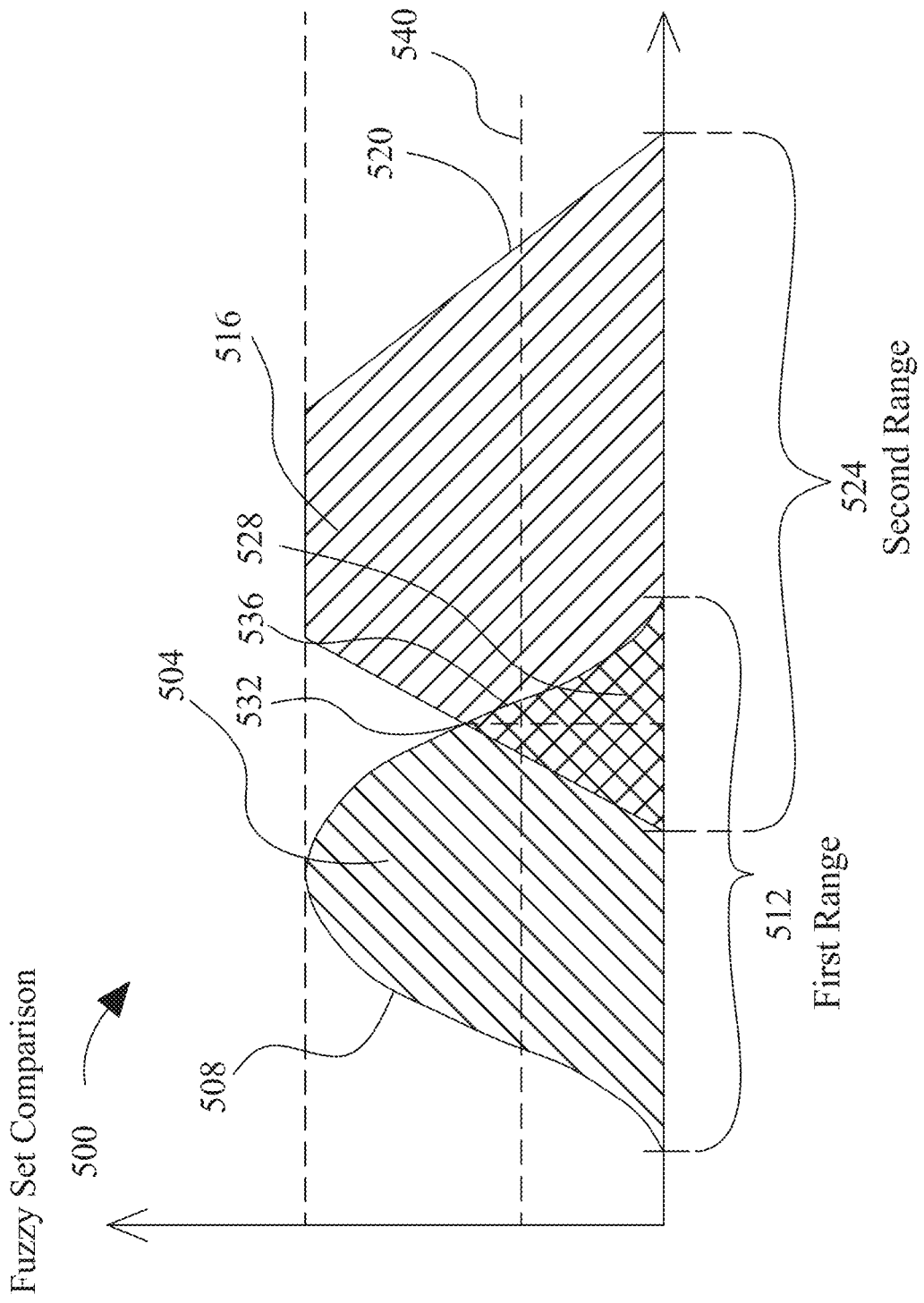
FIG. 5 is a graph illustrating an exemplary relationship between fuzzy sets.

Referring to FIG. 5, an exemplary embodiment of fuzzy set comparison 500 is illustrated. In one or more embodiments, data describing any described process relating to providing a skill factor hierarchy to a user as performed by processor of computing device 104 may include data manipulation or processing including fuzzy set comparison 500. In addition, in one or more embodiments, usage of an inference engine relating to data manipulation may involve one or more aspects of fuzzy set comparison 500 as described herein. That is, although discrete integer values may be used as data to describe, for example, one or more instances of any one or more of offer datum 120, acceptance datum 136, rejection datum 124, and/or rejection datum 124, as well as category data 162 and/or user attributes 132, fuzzy set comparison 500 may be alternatively used. For example, a first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range of values 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models, one or more instances of any one or more of offer datum 120, acceptance datum 136, rejection datum 124, and/or rejection datum 124, as well as category data 162 and/or user attributes 132, and a predetermined class, such as without limitation, query data or information including interface data structure 108s stored in offer evaluation database 300 of FIG. 3. A second fuzzy set 516, which may represent any value which may be represented by first fuzzy set 504, may be defined by a second membership function 520 on a second range of values 524; second range of values 524 may be identical and/or overlap with first range of values 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively, or additionally, a single value of first and/or second fuzzy set may be located at a locus 536 on first range of values 512 and/or second range of values 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models one or more instances of any one or more of offer datum 120, acceptance datum 136, rejection datum 124, and/or rejection datum 124, as well as category data 162 and/or user attributes 132 and a predetermined class, such as without limitation, query data categorization, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify one or more instances of any one or more of offer datum 120, acceptance datum 136, rejection datum 124, and/or rejection datum 124, to as well as category data 162 and/or user attributes 132 stored in offer evaluation database 300. For instance, if offer datum 120 and/or interface data structure 108 112 has a fuzzy set matching certain interface data structure 108 data values stored in offer evaluation database 300 (e.g., by having a degree of overlap exceeding a threshold), computing device 104 may classify one or more instances of any one or more of offer datum 120, acceptance datum 136, rejection datum 124, and/or rejection datum 124 as belonging to user attributes 132 (e.g., aspects of user behavior as demonstrated by user attributes 132 of FIG. 1 and/or rejection label 308 of FIG. 3 relating to user commitment towards achieving rejection datum 124). Where multiple fuzzy matches are performed, degrees of match for each respective fuzzy set may be computed and aggregated through, for instance, addition, averaging, or the like, to determine an overall degree of match.

Still referring to FIG. 5, in an embodiment, offer datum 120 and/or acceptance datum 136 may be compared to multiple offer evaluation database 300 categorization fuzzy sets. For instance, offer datum 120 and/or acceptance datum 136 may be represented by a fuzzy set that is compared to each of the multiple offer evaluation database 300 categorization fuzzy sets; and a degree of overlap exceeding a threshold between the offer datum 120 and/or acceptance datum 136 fuzzy set and any of the offer evaluation database 300 categorization fuzzy sets may cause computing device 104 to classify one or more instances of any one or more of offer datum 120, acceptance datum 136, rejection datum 124, and/or rejection datum 124 as belonging to one or more corresponding interface data structure 108s associated with offer evaluation database 300 categorization (e.g., selection from categories in offer evaluation database 300, etc.). For instance, in one embodiment there may be two offer evaluation database 300 categorization fuzzy sets, representing, respectively, offer evaluation database 300 categorization (e.g., into each of acceptance label 304, rejection label 308, progress label 312, and/or purpose label 316). For example, a First offer evaluation database 300 categorization may have a first fuzzy set; a Second offer evaluation database 300 categorization may have a second fuzzy set; and one or more instances of any one or more of offer datum 120, acceptance datum 136, rejection datum 124, and/or rejection datum 124, to as well as category data 162 and/or user attributes 132 may each have a corresponding fuzzy set.

Computing device 104, for example, may compare one or more instances of any one or more of offer datum 120, acceptance datum 136, rejection datum 124, and/or rejection datum 124, to as well as category data 162 and/or user attributes 132 fuzzy sets with fuzzy set data describing each of the categories included in offer evaluation database 300, as described above, and classify one or more instances of any one or more of offer datum 120, acceptance datum 136, rejection datum 124, and/or rejection datum 124, to as well as category data 162 and/or user attributes 132 to one or more categories (e.g., acceptance label 304, rejection label 308, progress label 312, and/or purpose label 316). Machine-learning methods as described throughout may, in a non-limiting example, generate coefficients used in fuzzy set equations as described above, such as without limitation x, c, and σ of a Gaussian set as described above, as outputs of machine-learning methods. Likewise, any described datum herein may be used indirectly to determine a fuzzy set, as, for example, offer datum 120 fuzzy set and/or acceptance datum 136 fuzzy set may be derived from outputs of one or more machine-learning models that take offer datum 120 and/or acceptance datum 136 directly or indirectly as inputs.

Still referring to FIG. 5, a computing device may use a logic comparison program, such as, but not limited to, a fuzzy logic model to determine an offer evaluation database 300 response. A offer evaluation database 300 response may include, but is not limited to, accessing and/or otherwise communicating with any one or more of acceptance label 304, rejection label 308, progress label 312, purpose label 316, and the like; each such offer evaluation database 300 response may be represented as a value for a linguistic variable representing offer evaluation database 300 response or in other words a fuzzy set as described above that corresponds to a degree of matching between data describing offer datum 120 and/or acceptance datum 136 and one or more categories within offer evaluation database 300 as calculated using any statistical, machine-learning, or other method that may occur to a person skilled in the art upon reviewing the entirety of this disclosure.

In some embodiments, determining an offer evaluation database 300 categorization may include using a linear regression model. A linear regression model may include a machine-learning model. A linear regression model may be configured to map data of offer datum 120 and/or acceptance datum 136, to one or more offer evaluation database 300 parameters. A linear regression model may be trained using a machine-learning process. A linear regression model may map statistics such as, but not limited to, quality of offer datum 120 and/or acceptance datum 136. In some embodiments, determining offer evaluation database 300 of offer datum 120 and/or acceptance datum 136 may include using an offer evaluation database 300 classification model. An offer evaluation database 300 classification model may be configured to input collected data and cluster data to a centroid based on, but not limited to, frequency of appearance, linguistic indicators of quality, and the like. Centroids may include scores assigned to them such that quality of offer datum 120 and/or acceptance datum 136 may each be assigned a score.

In some embodiments, offer evaluation database 300 classification model may include a K-means clustering model. In some embodiments, offer evaluation database 300 classification model may include a particle swarm optimization model. In some embodiments, determining the offer evaluation database 300 of offer datum 120 and/or acceptance datum 136 may include using a fuzzy inference engine (e.g., to assess the progress of the user and use said data to amend or generate new strategies based on user progress). A fuzzy inference engine may be configured to map one or more instances of any one or more of offer datum 120, acceptance datum 136, rejection datum 124, and/or rejection datum 124, to as well as category data 162 and/or user attributes 132 data elements using fuzzy logic. In some embodiments, the described datum may be arranged by a logic comparison program into offer evaluation database 300 arrangement. A "offer evaluation database 300 arrangement" as used in this disclosure is any grouping of objects and/or data based on similarity to each other and/or relation to providing instruction set 224B of FIG. 2B to the user for the user to achieve. This step may be implemented as described above in FIG. 1.

Membership function coefficients and/or constants as described above may be tuned according to classification and/or clustering algorithms. For instance, and without limitation, a clustering algorithm may determine a Gaussian or other distribution of questions about a centroid corresponding to a given scoring level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented to assess the progress of the user and use said data to amend or generate new strategies based on user progress according to input and/or output membership functions and/or linguistic variables. For instance, a first linguistic variable may represent a first measurable value pertaining to offer datum 120 and/or acceptance datum 136, such as a degree of matching between data describing user aspirations and strategies based on responses to interface data structure 108s stored in offer evaluation database 300. Continuing the example, an output linguistic variable may represent, without limitation, a score value. An inference engine may combine rules, such as: "if the demonstrated commitment level of a person or business falls beneath a threshold," and "the observed performance of the person or business relative to their or its peers is deficient," the commitment score is 'deficient'—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 6:
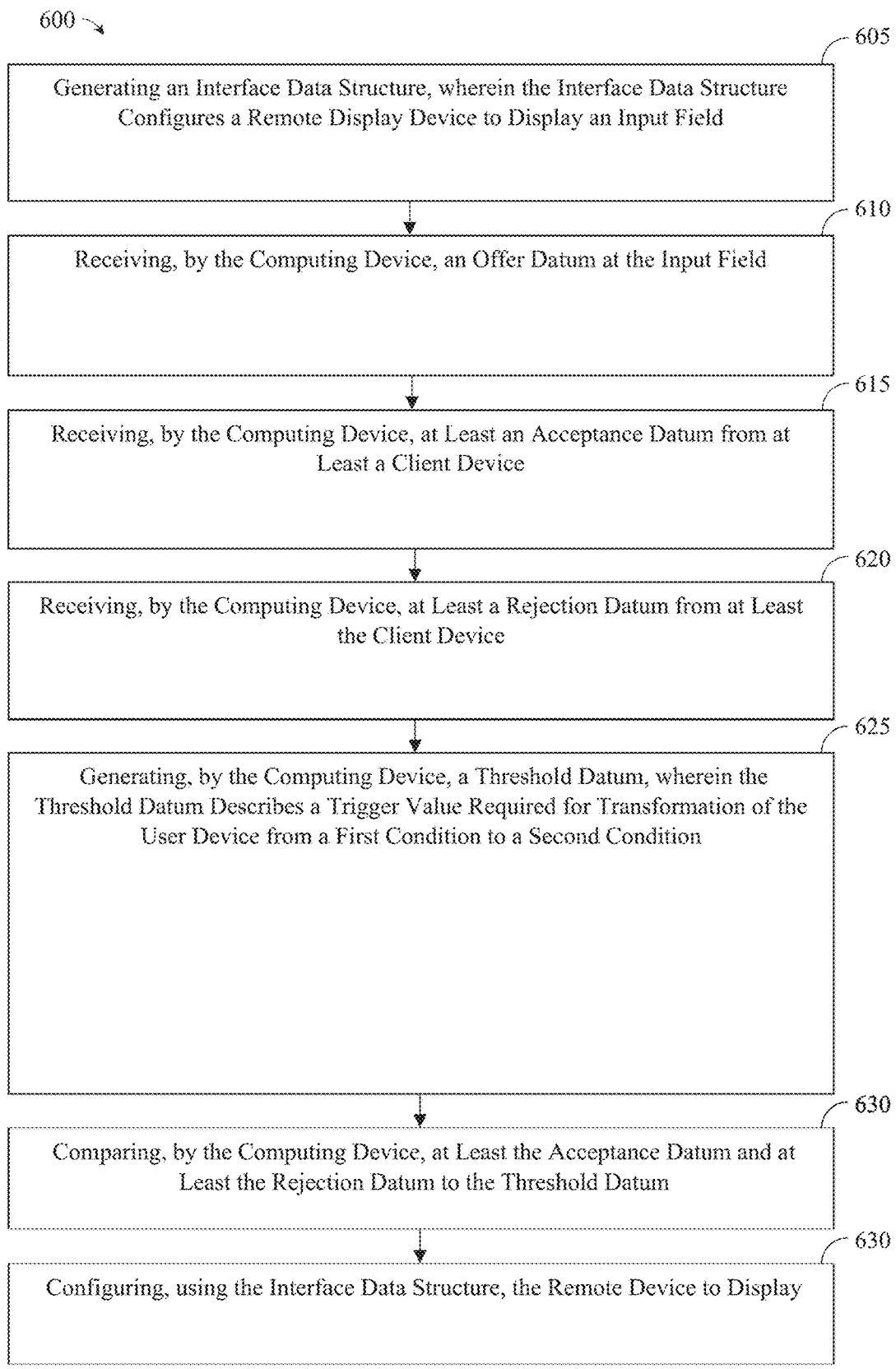
FIG. 6 is a flow diagram of an exemplary method for generating an instruction set for a user.

Now referring to FIG. 6, method 600 for generating an instruction set is described. At step 605, method 600 includes initiating, by a computing device, an offer datum to be sent from a client device to at least a user device, wherein the at least a user device is communicatively connected to the computing device and the client device, the offer datum describing a sequence of activities. This step may be implemented as described above, without limitation, in FIGS. 1-7.

Still referring to FIG. 6, at step 610, method 600 includes receiving, by the computing device, at least an acceptance datum from at least a client device, wherein the acceptance datum describes initiation of resource transfer from a respective client device to the user device based on the sequence of activities. This step may be implemented as described above, without limitation, in FIGS. 1-7.

Still referring to FIG. 6, at step 615, method 600 includes receiving, by the computing device, at least a rejection datum from at least a client device, wherein the rejection datum describes cessation of resource transfer from a respective client device to the user device based on the sequence of activities. This step may be implemented as described above, without limitation, in FIGS. 1-7.

Still referring to FIG. 6, at step 620, method 600 includes receiving, by the computing device, a threshold datum from a database communicatively connected to the computing device, wherein the threshold datum describes a trigger value required for transformation of the user device from a first condition to a second condition. This step may be implemented as described above, without limitation, in FIGS. 1-7.

Still referring to FIG. 6, at step 625, method 600 includes classifying, by the computing device, at least the acceptance datum and at least the rejection datum to the threshold datum, wherein classifying at least the acceptance datum comprises generating a composite acceptance datum based on aggregating acceptance data; generating a composite rejection datum based on aggregating rejection data; and determining whether the composite acceptance datum exceeds the trigger value by comparing the composite acceptance datum to the threshold datum. This step may be implemented as described above, without limitation, in FIGS. 1-7.

Still referring to FIG. 6, at step 630, method 600 includes generating, by the computing device, an interface data structure 108 including an input field, wherein the interface data structure 108 configures a remote display device to display the input field to the user device; receive at least a user-input datum into the input field, wherein the user-input datum updates the threshold datum; and display the instruction set including displaying the user-input datum. This step may be implemented as described above, without limitation, in FIGS. 1-7.

Figure 7:
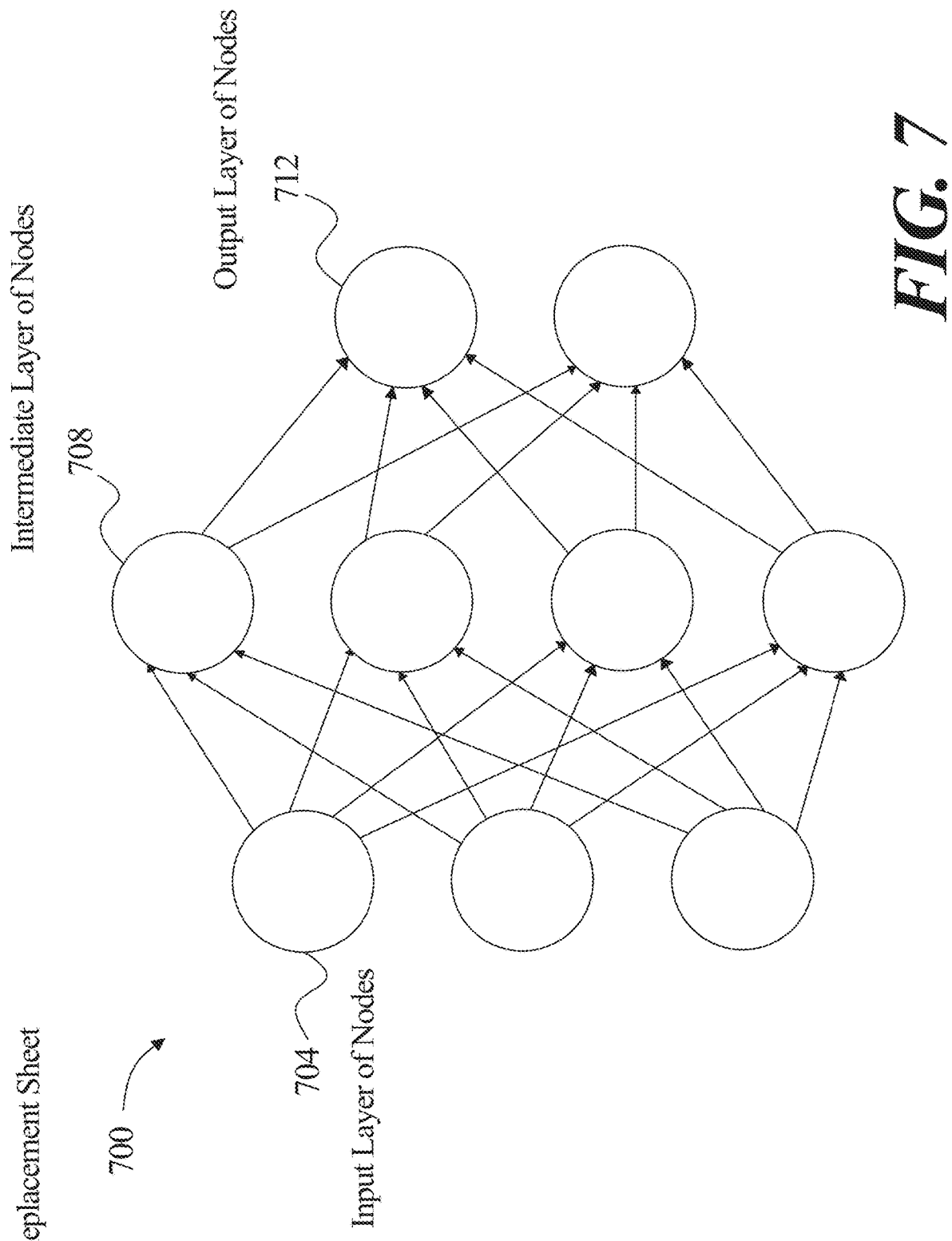
FIG. 7 is a diagram of an exemplary embodiment of neural network.

Referring now to FIG. 7, an exemplary embodiment of neural network 700 is illustrated. A neural network 700, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 704, one or more intermediate layers 708, and an output layer of nodes 712. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 8:
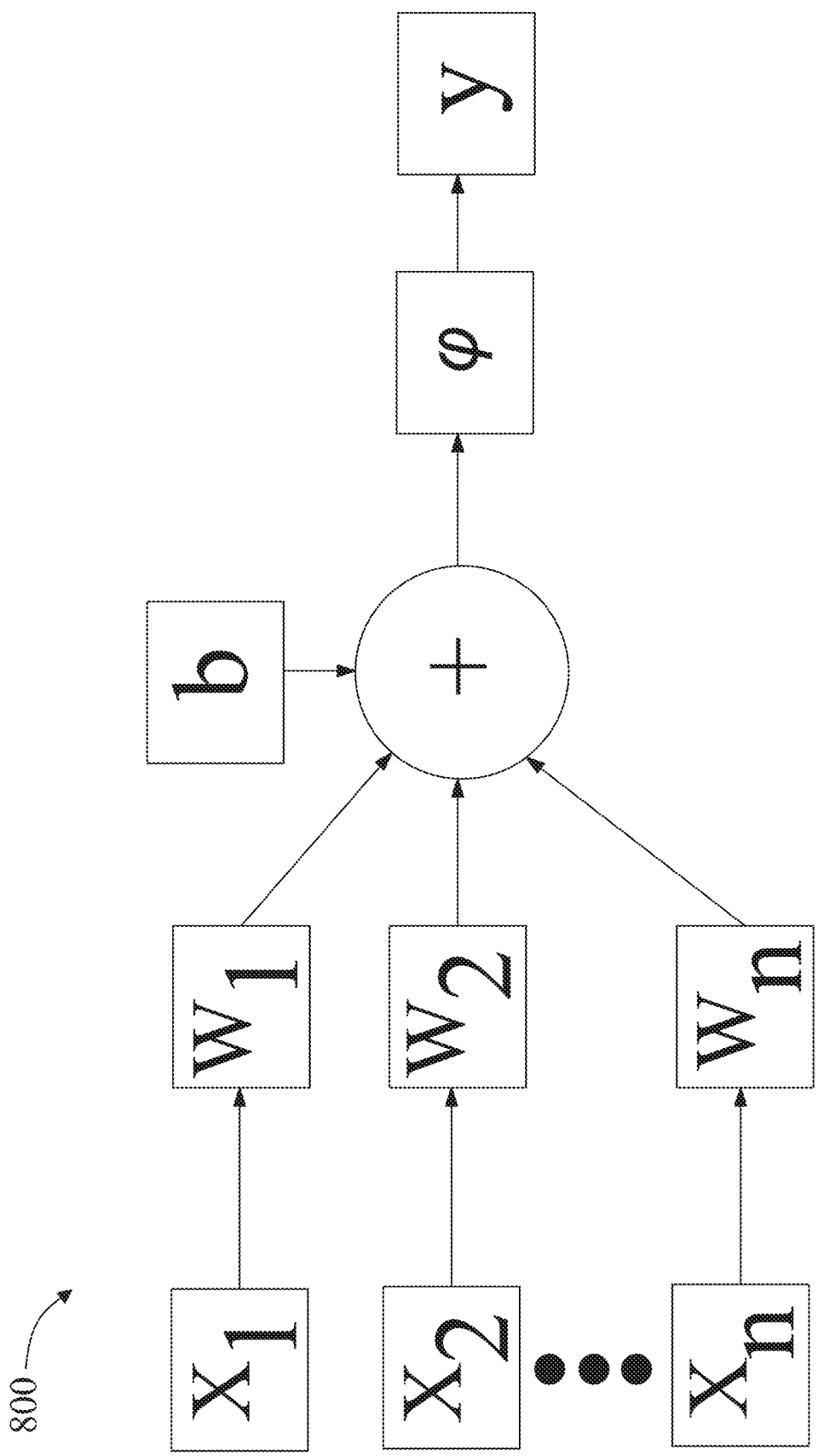
FIG. 8 is a diagram of an exemplary embodiment of a node of a neural network.

Referring now to FIG. 8, an exemplary embodiment of a node 800 of a neural network is illustrated. A node may include, without limitation, a plurality of inputs x, that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs x, that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
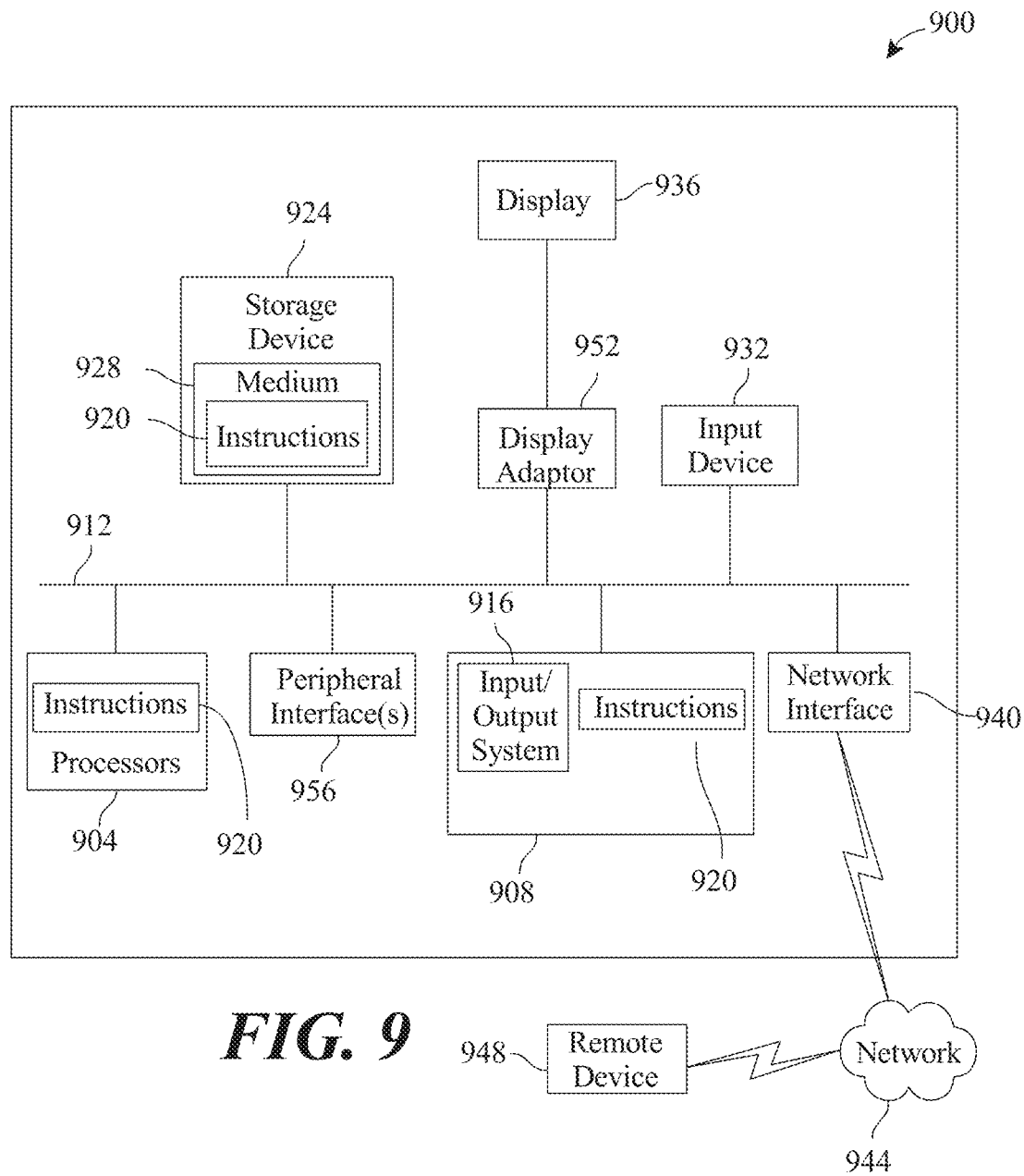
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display device 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Video display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate to provide a multiplicity of feature combinations in associated new embodiments. Furthermore, while the foregoing describes several separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatus, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for generating an instruction set, the apparatus comprising:
   at least a processor;
   a memory connected to the processor, the memory containing instructions configuring the at least a processor to:
      generate an interface data structure, wherein the interface data structure configures a remote display device to display an input field;
      receive an offer datum at the input field;
      receive at least an acceptance datum from at least a client device, wherein the acceptance datum describes initiation of resource transfer from a respective client device to the user device based on the sequence of activities;
      receive at least a rejection datum from at least the client device, wherein the rejection datum describes cessation of resource transfer from a respective client device to the user device based on the sequence of activities;
      generate a threshold datum, wherein the threshold datum describes a trigger value required for transformation of the user device from a first condition to a second condition;
      compare at least the acceptance datum and at least the rejection datum to the threshold datum, wherein comparing comprises:
         generating a composite acceptance datum based on aggregating acceptance data;
         generating a composite rejection datum based on aggregating rejection data; and
         determining whether the composite acceptance datum exceeds the trigger value by comparing the composite acceptance datum to the threshold datum;
      classify at least the acceptance datum and at least the rejection datum to the threshold datum further comprises:
         determining a pattern based on user interaction with the database;
         classifying at least an element of the pattern to the divergence value; and
         adjusting the pattern based on a magnitude of the divergence value; and
      configure, using the interface data structure, the remote device to display the determination.

2. The apparatus of claim 1, wherein generating the interface data structure further comprises:
   retrieving data describing attributes of a user from a database communicatively connected to the processor; and
   generating the interface data structure based on the data describing attributes of the user, wherein generating the interface data structure further comprises:
      determining at least a vector from the user-input datum to the threshold datum; and
      configuring the remote display device to display a representation of at least the vector.

3. The apparatus of claim 2, wherein determining the at least the vector from the user-input datum to the threshold datum further comprises generating the vector including an angle value and a distance value, wherein:
   the angle value and the distance value describe at least a divergence value between the user-input datum and the threshold datum.

4. The apparatus of claim 1, wherein receiving the threshold datum further comprises:
retrieving data describing current preferences of the user device between a minimum value and a maximum value from the database; and
receiving a form element input into the input field, wherein the form element describes at least the minimum value.

5. The apparatus of claim 1, wherein classifying the at least an acceptance datum and the at least a rejection datum to the threshold datum further comprises generating at least an additional input field based on the divergence value, wherein:
the divergence value describes divergence between the composite acceptance datum and the composite rejection datum.

6. The apparatus of claim 1, wherein classifying the at least an acceptance datum and the at least a rejection datum to the threshold datum further comprises:
classifying at least an instance of the composite acceptance datum to the threshold datum;
determining a proximity value of a respective acceptance datum to the threshold datum calculated based on classification of the composite acceptance datum to the threshold datum; and
adjusting the threshold datum based on the composite acceptance datum to reduce the proximity value.

7. The apparatus of claim 1, wherein classifying at least the acceptance datum and at least the rejection datum to the threshold datum further comprises:
classifying the composite acceptance datum to the threshold datum, wherein classifying the composite acceptance datum further comprises:
comparing the composite acceptance datum to the threshold datum; and
determining a parity value based on comparison of the composite acceptance datum to the threshold datum, wherein the parity value is included within the instruction set.

8. The apparatus of claim 1, wherein classifying at least the acceptance datum and at least the rejection datum to the threshold datum further comprises:
evaluating the user-input datum by classifying one or more new instances of the user-input datum to at least the threshold datum;
generating at least a divergence value based on the classification; and
displaying the at least a divergence value.

9. The apparatus of claim 8, wherein classify at least the acceptance datum and at least the rejection datum to the threshold datum further comprises:
classifying the composite acceptance datum to a label selected from a plurality of labels based on at least the divergence value, wherein classifying at least the composite acceptance datum comprises:
organizing at least some labels based on their respective proximity to a minimal output type and a maximum output type;
aggregating acceptance data based on the classification; and
classifying aggregated acceptance data to the label having a closest proximity to the maximum output type.

10. A method for generating an instruction set, the method comprising:
generating, by a computing device an interface data structure, wherein the interface data structure configures a remote display device to display an input field;
receiving, by the computing device, an offer datum at the input field;
receiving, by the computing device, at least an acceptance datum from at least a client device, wherein the acceptance datum describes initiation of resource transfer from a respective client device to the user device based on the sequence of activities;
receiving, by the computing device, at least a rejection datum from at least the client device, wherein the rejection datum describes cessation of resource transfer from a respective client device to the user device based on the sequence of activities;
generating, by the computing device, a threshold datum, wherein the threshold datum describes a trigger value required for transformation of the user device from a first condition to a second condition;
comparing, by the computing device, at least the acceptance datum and at least the rejection datum to the threshold datum, wherein comparing comprises:
generating a composite acceptance datum based on aggregating acceptance data;
generating a composite rejection datum based on aggregating rejection data; and
determining whether the composite acceptance datum exceeds the trigger value by comparing the composite acceptance datum to the threshold datum;
classifying, by the computing device, at least the acceptance datum and at least the rejection datum to the threshold datum further comprises:
determining a pattern based on user interaction with the database;
classifying at least an element of the pattern to the divergence value; and
adjusting the pattern based on a magnitude of the divergence value; and
configuring, using the interface data structure, the remote device to display the determination.

11. The method of claim 10, wherein generating the interface data structure further comprises:
retrieving data describing attributes of a user from a database communicatively connected to the computing device; and
generating the interface data structure based on the data describing attributes of the user, wherein generating the interface data structure further comprises:
determining at least a vector from the user-input datum to the threshold datum; and
configuring the remote display device to display a representation of at least the vector.

12. The method of claim 11, wherein determining the at least the vector from the user-input datum to the threshold datum further comprises generating the vector including an angle value and a distance value, wherein:
the angle value and the distance value describe at least a divergence value between the user-input datum and the threshold datum.

13. The method of claim 10, wherein receiving the threshold datum further comprises:
retrieving data describing current preferences of the user device between a minimum value and a maximum value from the database; and receiving a form element input into the input field, wherein the form element describes at least the minimum value.

14. The method of claim 10, further comprising generating at least an additional input field based on a divergence value, wherein:
the divergence value describes divergence between the composite acceptance datum and the composite rejection datum.

15. The method of claim 10, further comprising:
classifying at least an instance of the composite acceptance datum to the threshold datum;
determining a proximity value of a respective acceptance datum to the threshold datum calculated based on classification of the composite acceptance datum to the threshold datum; and
adjusting the threshold datum based on the composite acceptance datum to reduce the proximity value.

16. The method of claim 10, further comprising:
classifying the composite acceptance datum to the threshold datum, wherein classifying the composite acceptance datum further comprises:
comparing the composite acceptance datum to the threshold datum; and
determining a parity value based on comparison of the composite acceptance datum to the threshold datum, wherein the parity value is included within the instruction set.

17. The method of claim 10, further comprising:
evaluating the user-input datum by classifying one or more new instances of the user-input datum to at least the threshold datum;
generating at least a divergence value based on the classification; and
displaying the at least a divergence value.

18. The method of claim 17, further comprising:
classifying the composite acceptance datum to a label selected from a plurality of labels based on at least the divergence value, wherein classifying the composite acceptance datum comprises:
organizing at least some labels based on their respective proximity to a minimal output type and a maximum output type;
aggregating acceptance data based on the classification; and
classifying aggregated acceptance data to the label having a closest proximity to the maximum output type.

* * * * *